Figure 1:
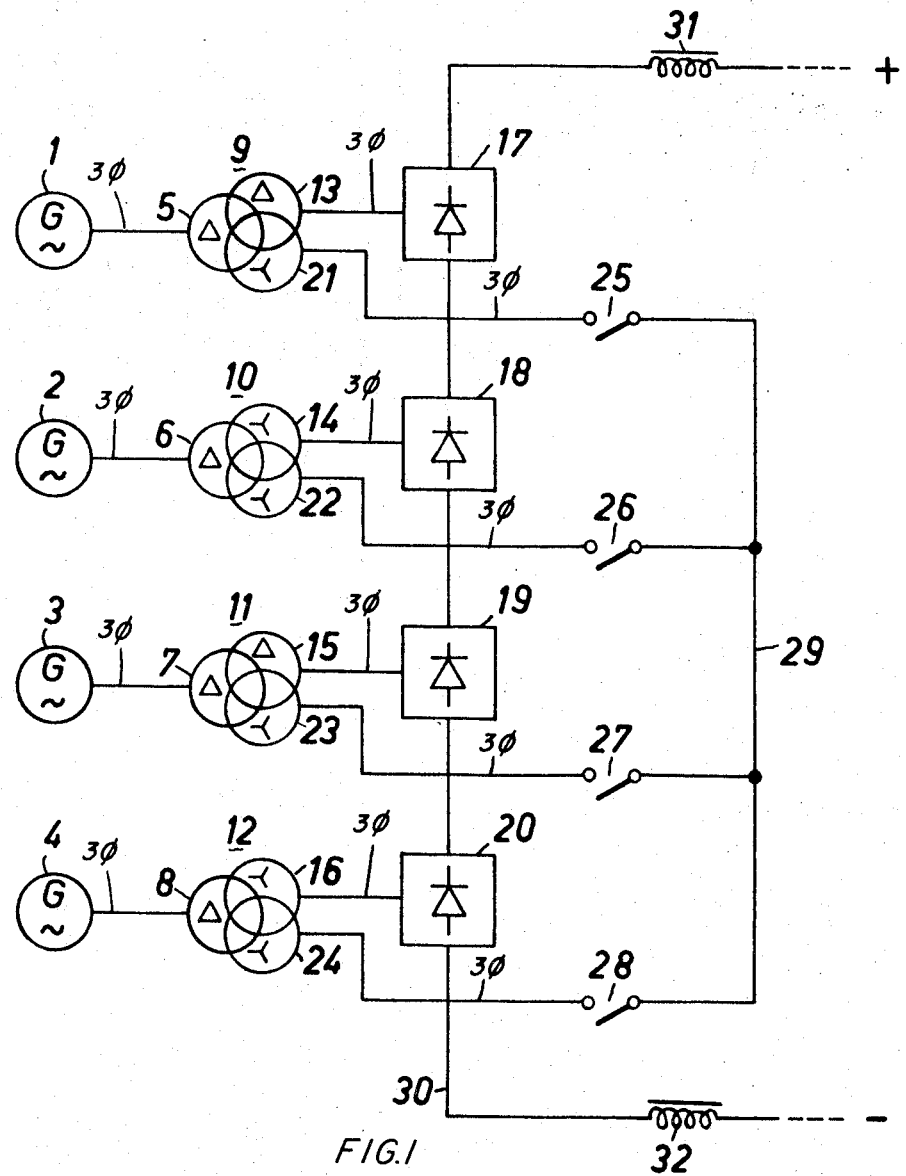

United States Patent

[11] 3,558,904

| | | | |
|---|---|---|---|
| [72] | Inventor | Karl-Werner Kanngiesser Viernheim, Germany | |
| [21] | Appl. No. | 760,860 | |
| [22] | Filed | Sept. 19, 1968 | |
| [45] | Patented | Jan. 26, 1971 | |
| [73] | Assignee | Aktiengesellschaft Brown, Boveri & Cie Baden, Switzerland a joint stock company | |
| [32] | Priority | Sept. 26, 1967 | |
| [33] | | Germany | |
| [31] | | 1,613,573 | |

[54] HIGH VOLTAGE DIRECT-CURRENT TRANSMISSION SYSTEM FOR A POWER STATION
6 Claims, 3 Drawing Figs.

[52] U.S. Cl. .................................................. 307/82, 307/84, 321/9, 321/27
[51] Int. Cl. ...................................................... H02j 1/02, H02m 1/12
[50] Field of Search .......................................... 321/9, 26, 27; 307/82—84

[56] References Cited
UNITED STATES PATENTS
3,280,334  10/1966  Uhlman et al. ............... 307/83
FOREIGN PATENTS
1,078,336  8/1967  Great Britain................ 321/27

*Primary Examiner*—William H. Beha, Jr.
*Attorney*—Pierce, Scheffler & Parker

ABSTRACT: A high voltage direct current transmission system comprises a plurality of parallel arranged three-phase AC generators, a three-phase transformer connected to the output of each generator and a three-phase bridge type converter connected to the output of each transformer. The DC voltage outputs of the converters are connected in series and then fed over the transmission line system where they are then reconverted into AC. Each of the transformers includes a three-phase tertiary winding, and corresponding phases of the tertiary windings of these transformers are connected through power switches to a busbar, there being one such busbar assigned to each phase.

HIGH VOLTAGE DIRECT-CURRENT TRANSMISSION SYSTEM FOR A POWER STATION

The present invention relates to a terminal station of a high voltage direct current transmission installation, connected to a power station, and comprising several generators operating in parallel with associated three-winding transformers and rectifier bridges, connected in series at the DC side. Hitherto, the main application of these high voltage direct current transmissions was in the transportation of energy across waterways and in connecting three-phase current networks with different frequencies. In the future, however, an important function of high voltage direct current transmission will be the feeding of the output of power stations into an existing three-phase network or the transport of the output of remote power stations to the consuming three-phase network.

One such installation is already under construction (Direct Current, May 1966, p. 53). In this installation, the methods hitherto used in power stations have been adopted, in which the individual units of the current converter station, namely, the current converter valves arranged in a three-phase bridge circuit, with the associated transformer converter, are connected to a three-phase high voltage busbar. This busbar is supplied by the machine transformer of the power station transformers. Such a busbar circuit permits a free distribution of the power station output amongst the HV-DC transmissions and other consumers connected via HV-AC lines. With remote power stations which supply their outputs only via HV-DC transmissions, this advantage of the busbar circuit does not apply. Also with power stations located near the consumers, it might be convenient to provide an exclusive removal of the power station output by HV-dc transmission, because the HV-DC transmission link does not raise the short circuit performance in the fed three-phase distributing network.

Where a power station is connected exclusively by means of HV-DC transmission, it might be convenient to avoid the twofold transmission of the generator voltage with corresponding two-fold transformer losses by constructing the current converter transformers as machine transformers, i.e. connecting them directly to the generator terminals to form a unit or "block" circuit consisting of the generator with a transformer and a bridge. In this case there is no connection on the AC side between the power station generators, and only the current converter bridges are connected conventionally in series in order to produce a sufficiently high transformer voltage. An equal output distribution amongst the generators is achieved automatically by keeping the DC voltages of the individual bridges at the same level. However, this simple circuit has several disadvantages, thus the six-pulse reactance of the current converter bridge loads the damper cage of the AC generator owing to the fifth and seventh order harmonics contained in the primary current. In addition, the generally very high subtransient reactance of the AC generator is absorbed fully in the commutation reactance and causes a large angle of overlap, producing a high inductive DC voltage drop and a large commutation reactive power. For this reason the transformer and the generator must be dimensioned for a correspondingly high-no-load voltage. Since also the different generators do not necessarily operate synchronously, no 12-pulse voltage form is ensured on the DC voltage side.

Finally, with a fault of only one unit, the complete block fails. For example, during the overhaul of one turbine, the whole block is out of commission for this time and the HV-DC transmission operation must work with one current converter bridge less, i.e. at reduced voltage.

In order to eliminate these drawbacks, there are already known circuits containing two three-phase bridge circuits per current converter transformer wherein one bridge circuit is connected to the star connected secondary winding of the transformer and the second to the delta connected secondary winding (see "Elektrizituatswirtschaft," No. 21, 1964, pp. 739seq.). Here, the six-pulse reaction on the generator is avoided because both current converter bridges act together in a 12-pulse manner and the subtransient reactance of the generator enters percentually only with half its value into the commutation reactance because the commutation in both bridges is effected with a phase shift of 30°. Finally, 12-pulse operation is assured also in the DC line. However, the last mentioned disadvantage of the block circuit still exists, namely, that the whole block is out of commission with the failure of one component. In addition, the bridge performance can only be equal to half the generator output. In many cases this results not only in the installation being more expensive, but also in a much more complicated construction.

These last-mentioned disadvantages could be avoided by a direct busbar circuit in which all power station generators work on a busbar to which all power station current converter transformers are connected. However, with modern generator outputs and with voltages about 20 kv., excessive busbar dimensions are obtained. In addition, at present there are no 20 kv. power switches which can switch the short circuit currents occurring in such busbars. For this reason, the use of this circuit is impossible.

The general object of this invention is to provide an installation in which the advantages of the busbar circuit in HV-DC transmission installations are maintained, whilst the disadvantages are eliminated. According to the invention, this object is realized in that the tertiary windings of all transformers are connected through power switches by a medium voltage busbar. In a preferred embodiment of this arrangement, the tertiary windings are connected alternatively in star and in delta. In addition, in many cases it might be advantageous to divide the busbar into two parts with equal performances which can be connected by a coupling switch.

Figure 2:
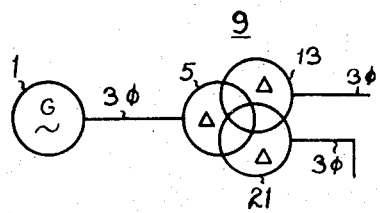
Figure 2:
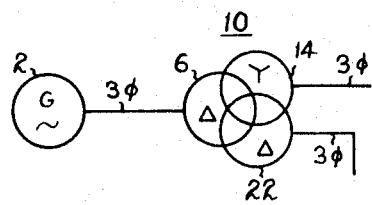
Figure 2:
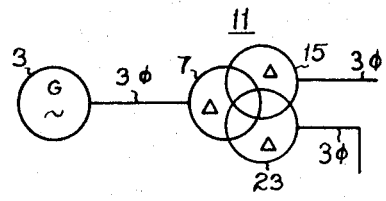
Figure 2:
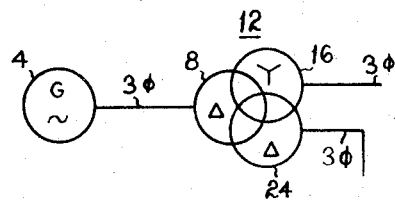
Figure 3:
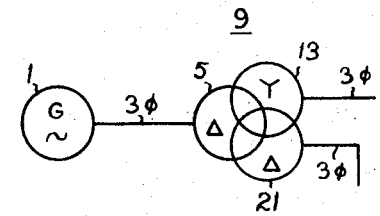
Figure 3:
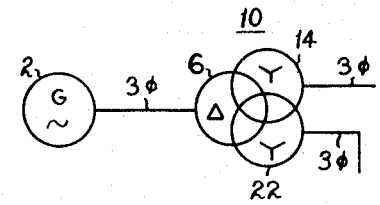
Figure 3:
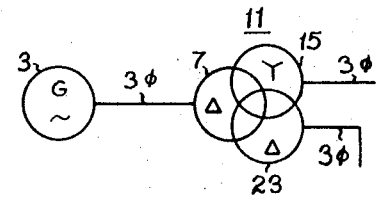
Figure 3:
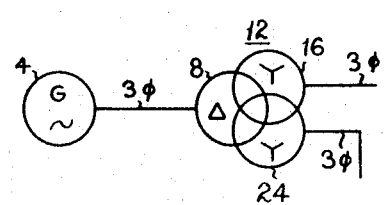

The invention will be further described, by way of example, with reference to the accompanying drawings wherein:

FIG. 1 is an electrical schematic view of one embodiment of the invention in which the three-phase tertiary windings of all the transformers correlated to the respective three-phase generators are connected in star;

FIG. 2 is a partial schematic of a modified embodiment wherein the three-phase tertiary windings of all transformers are connected in delta; and FIG. 3 is a partial schematic of still another modification wherein the three-phase tertiary windings of the transformers are connected alternately in delta and in star, the primary windings of all transformers being all of the same type of connection, preferably delta, and the secondary windings of all transformers also being of the same type of connection, preferably star.

With reference now to FIG. 1, the three-phase current generators 1 to 4 of a power station are connected to the three-phase delta connected primary windings 5 to 8 of converter transformers 9 to 12. Each transformer 9 to 12 has a three-phase secondary winding 13 to 16 to which are connected the series-mounted converter bridges 17 to 20, and a three-phase tertiary winding 21 to 24, each phase of each three-phase tertiary winding being connected by a separate power switch 25 to 28 with a common busbar 29. That is to say, there would be three such switches for each three-phase tertiary winding and separate busbar interconnecting corresponding phases of the tertiary windings of the several transformers. The secondary three-phase windings 13 to 16 of the transformers 9 to 12 are connected alternatively in star and delta. In the positive and negative branches, respectively, of the DC line 30, there are smoothing chokes 31 and 32, respectively. Since the tertiary windings of all transformers are all interconnected by a medium voltage busbar, the synchronous running of all generators is necessarily obtained. With the conventional construction of the transformer converters with alternatively different circuits of delta and star of the first transformer group, delta-delta of the transformer of the second group and so on, the 12-pulse DC voltage of the station is assured. Furthermore, the fifth, seventh, 17 and 19 harmonics of the six coil operation may be equalized in the tertiary busbar. Since the reactances of these circuits amount only to a small fraction of the reactance of the machine, the generators are, in practice, completely relieved of the harmonics of six-cell operation.

FIG. 2 illustrates a modified embodiment similar to FIG. 1 but wherein all of the three-phase tertiary windings of the transformers are connected in delta.

According to a further feature of the invention, the same result may be achieved in that all primary windings have the same circuit connection, preferably a delta, and all secondary windings again the same circuit connection, preferably star, whilst the tertiary windings are connected alternatively in star and delta, this modification being illustrated in FIG. 3. This may lead to a structural simplification and thus to cheaper transformers.

The intermediate leakage reactance between the primary and tertiary windings of the transformer limit the short circuit performance on the tertiary busbar so that the power switch can ensure a reliable short circuit protection. The nominal or short circuit current flowing in the tertiary winding may also be fixed within wide limits by selecting a suitable tertiary voltage. With very large outputs of the power station, the same object may also be realized by dividing the tertiary busbar into two or more identical sections so that the short circuit performance can be correspondingly reduced.

If the nominal output of the tertiary winding is so dimensioned that, in the case of failure of one generator, the output of the remaining generators associated with one DC terminal is distributed through the tertiary busbar uniformly over the converter bridges of this terminal, the arrangement according to the invention offers a further advantage. For example, with three generators per terminal and with one generator out of action due to overhaul of the turbine, the output of two generators would have to be distributed to three bridges, wherein the tertiary winding of the group under review would have to transmit two-thirds of the nominal transformer output, although under complete relief of the primary winding. The energy transmission could then be effected at full DC voltage and with a current reduced to two-thirds, which is far more favorable from the point of view of power losses than running at full current at two-thirds of the voltage.

In the arrangement according to the invention, the reactances of the generators 1 to 4 are connected in parallel via the tertiary winding. If the winding arrangement is so chosen that in the star-shaped equivalent circuit diagram the leakage reactance of the tertiary winding is equal to zero, the effective commutation reactance is substantially halved, that is to say, the circuit acts so, with regard to the current converter commutation, as if two bridges were connected together to a generator with double the output.

In this way, the angle of overlap remains small, the inductive DC voltage drop is low and the type performance of the transformer converters 9 to 12 and of the generators 1 to 4 may be chosen smaller than with six-pulse block circuitry. In addition, the fifth and seventh harmonics are substantially equalized through the medium voltage busbar 29 so that the generators 1 to 4 are affected by harmonics only according to a 12-pulse operation. In the case of failure of one of the generators 1 to 4, all bridges 17 to 20 may remain in operation, if the third windings 21 to 24 are dimensioned for a corresponding proportion of the nominal output. In this manner, the performance of the remaining generators may be transmitted in HV-DC transmission with full DC voltage and reduced direct current. If the short circuit performance of the medium voltage busbar is to be limited in larger power stations, a special medium voltage busbar might be provided for each DC terminal.

The advantages obtained by means of the invention are mainly that, with feeding the output of a power station through a HV-DC transmission system, the bridge performance is equal to the generator performance; that only half the value of the reactance of the machine enters into the commutation reactance; that the synchronous running of all generators is enforced; and that, with failure of one generator, the output is divided amongst all converter bridges. Thus, the advantages of the six-pulse block circuit are combined with those of the 12-pulse circuit, using two bridges per generator, and with those of the busbar circuit.

I claim:

1. A high voltage direct current transmission system comprising a plurality of three-phase alternating current generators operating in parallel, a three-phase transformer individual to each said generator, each said transformer including three-phase primary, secondary and tertiary windings, a three-phase converter bridge individual to each said transformer, circuit means connecting said converter bridges in series on their direct current output sides, circuit means connecting each phase of the three-phase voltage output of each said generator with the corresponding phased primary winding of the transformer correlated therewith, circuit means connecting each phase of the secondary windings of each transformer with the corresponding phase of the converter bridge correlated therewith, a busbar individual to and correlated with each phase of said transformer, and circuit means individual to each phase of each of said three-phase tertiary windings on said transformers and including a power switch for connecting corresponding phases of said tertiary windings to the busbar correlated therewith.

2. A high voltage direct current transmission system as defined in claim 1 wherein each generator forms a circuit block with its corresponding transformer and converter bridge.

3. A high voltage direct current transmission system as defined in claim 1 wherein the three-phase tertiary windings of each said transformer are connected in star.

4. A high voltage direct current transmission system as defined in claim 1 wherein the three-phase tertiary windings of each said transformer are connected in delta.

5. A high voltage direct current transmission system as defined in claim 1 wherein the three-phase tertiary windings of said transformers are connected alternately in delta and in star, wherein the three-phase primary windings of each said transformer have the same type of connection and wherein the three-phase secondary windings of each said transformer have the same type of connection.

6. A high voltage direct current transmission system as defined in claim 5 wherein the three-phase primary windings of each said transformer are connected in delta and the three-phase secondary windings of each said transformer are connected in star.